Feb. 27, 1951     H. A. W. PETERSEN     2,543,466
RODENT TRAP
Filed June 4, 1948
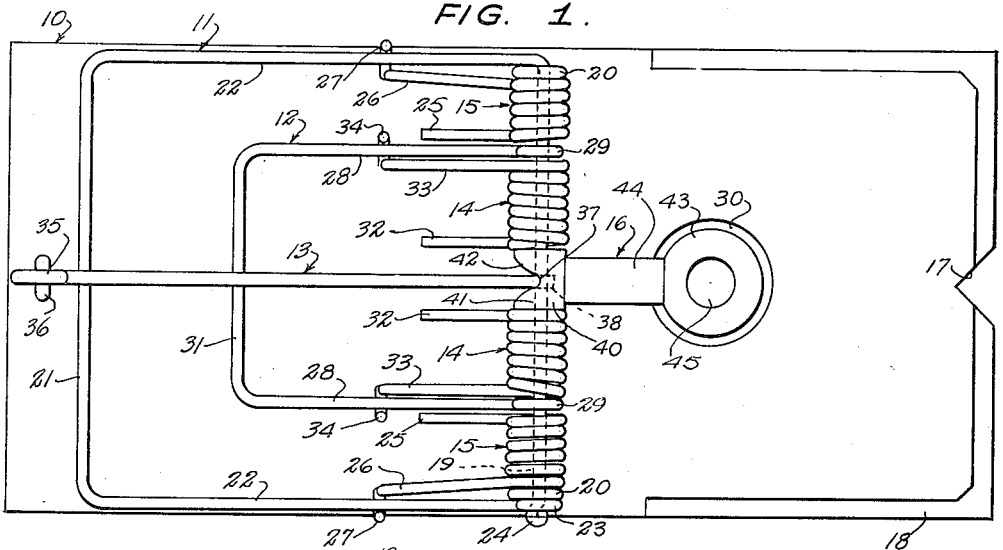
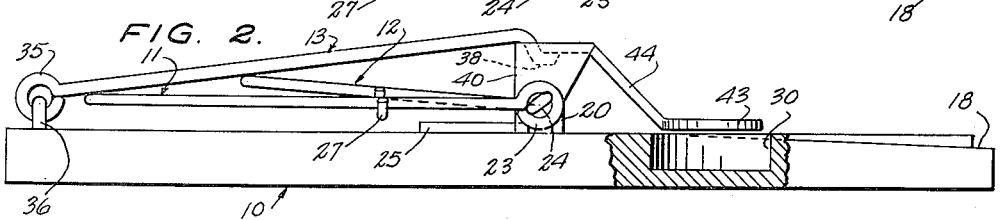
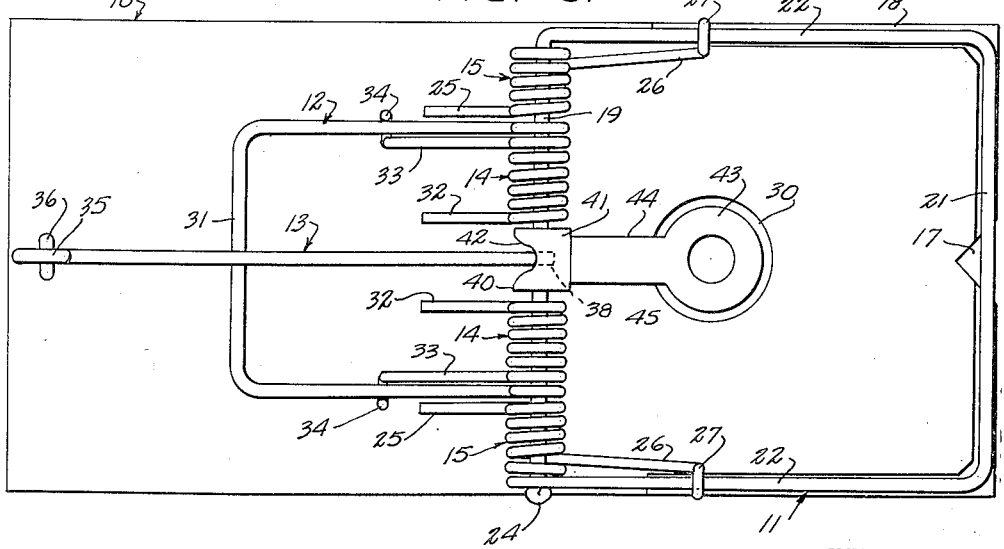
INVENTOR.
HEINRICH A. W. PETERSEN,
BY
McMorrow, Berman + Davidson
ATTORNEYS.

Patented Feb. 27, 1951

2,543,466

UNITED STATES PATENT OFFICE 2,543,466

RODENT TRAP

Heinrich A. W. Petersen, Knoxville, Tenn., assignor, by mesne assignments, of one-half to William D. Kelley Application June 4, 1948, Serial No. 31,049

1 Claim. (Cl. 43—81)

The present invention relates to improvements in rodent traps, and more particularly an improved trap for catching both large and small rodents, such as rats and mice.

It is among the objects of the invention to provide an improved rodent trap having a large jaw and a small jaw which are individually or collectively settable, and a single trigger for both jaws so constructed that bait cannot be removed from the trap without tripping the trap and which trap is simple and durable in construction, economical to manufacture, safe and easy to handle and convenient to operate.

Other objects and advantages will become apparent from a consideration of the following description and the appended claims in conjunction with the accompanying drawing, wherein:

Figure 1 is a top plan view of a rodent trap illustrative of the invention with both of the trap jaws in set position;

Figure 2 is a side elevation of the trap illustrated in Figure 1, a portion being broken away and shown in cross-section to better illustrate the construction thereof; and Figure 3 is a top plan view similar to Figure 1 showing the larger jaw of the trap in tripped position.

With continued reference to the drawing, the improved rodent trap comprises, in general, a flat, elongated, rectangular base 10, formed of wood or any suitable alternative material, a large jaw 11 and a small jaw 12 pivotally connected to the base substantially at the mid-length position of the latter, a jaw-restraining bar 13 pivotally connected to the base at the end thereof corresponding to the set position of the jaws, springs 14 and 15 operatively engaged between the jaws and the base to swing the jaws from their set to their tripped position, and a trigger 16.

The base 10 has a convenient size, for example, approximately 3-inches wide by 6-inches long by ½-inch thick, and is provided in the end thereof corresponding to the tripped position of the jaws with a V-shaped notch 17 positioned substantially midway of the width of the base. The marginal portion of the upper surface of the base is rabbeted out to provide a marginal groove 18 extending across the notched end of the base and along the adjacent sides thereof for a purpose which will presently appear.

The large jaw 11 is a rectangular-shaped member formed of heavy wire and having one side 19 extending transversely across the base substantially at the mid-length position of the latter and pivotally secured to the base by suitable fastening means, such as the spaced-apart staples 20. In addition to the one side or end 19, the large jaw 11 has an opposite end 21 and two sides 22 between the ends 19 and 21. In order to complete the rectangle, one of the sides 22 is provided at its end with an eye 23 and the side 19 is extended through this eye and provided with a loop 24 to prevent separation of the side and the end 19.

The two coiled torsion springs 15 surround the jaw end 19, one adjacent each end of the latter, and each of these springs has at its inner end an outwardly-extending arm 25 bearing on the base and at its outer end an outwardly-extending arm 26 provided at its outer end with a hook 27 connected to the corresponding side 22 of the large jaw to swing the jaw from its set position, illustrated in Figure 1, to its tripped position, illustrated in Figure 3.

When the large jaw 11 is in its tripped position, as illustrated in Figure 3, the sides 22 and end 21 lie in the marginal groove 18 of the base so that the outer end of the jaw is substantially flush with the top surface of the base and the end 21 overlies the notch 17 so that the portion of the end 21 extending across the notch provides a convenient finger-grip for raising the jaw from the base against the force of springs 15 and the space between this end of the jaw and the inner end of the notch provides a convenient peg-receiving aperture so that the trap can be suspended from a peg or nail for storage.

The small jaw 12 is also made of heavy wire and is of rectangular U-shape and materially smaller than the large jaw 11. This small jaw has two substantially parallel sides 28 provided at their ends with eyes 29 which surround the end 19 of the large jaw to pivotally connect the small jaw to the large jaw and to the base 10. The base is provided in its upper surface with a substantially circular bait-receiving recess 30 and the size of the small jaw 12 is such that when in its tripped position the end 31 thereof is positioned slightly beyond the side of the bait recess remote from the pivotally-mounted end 19 of the large jaw.

The two coiled springs 14 surround the end 19 of the large jaw, one at the inner side of each eye 29 of the small jaw and each of the springs has at its inner end an outwardly-extending arm 32 bearing upon the upper surface of the base and at its outer end an outwardly-extending arm 33 provided at its outer end with a hook 34 connected to the corresponding side 28 of the small jaw to swing the small jaw from its set position, illustrated in Figure 1, to its tripped position.

The jaw-retaining bar 13 is an elongated member of heavy wire having at one end an eye 35 pivotally secured to the end of the base corresponding to the set position of the jaws 11 and 12 by a screw-eye 36 threaded or otherwise secured in the base and having at its opposite end a shoulder 37 and a trigger-engaging abutment 38 projecting outwardly from the shoulder. The screw-eye 36 is located substantially midway the width of the base and the bar 13, when in operative position, extends longitudinally of the base adjacent the longitudinal center-line thereof and substantially across the centers of the ends 21 and 31 of the large jaw 11 and small jaw 12.

Trigger member 16 is preferably formed of light weight sheet metal and has a portion 40 of U-shaped cross-section the apertured legs of which pivotally receive the end 19 of the large jaw 11. This U-shaped portion has a flat topwall or bight 41 provided with a notch 42 in the edge thereof facing the jaw-restraining bar 13. The abutment 38 of the jaw-restraining bar is engageable under the top-wall or bight portion 41 of the trigger with the shoulder 37 positioned in the notch 42 of the trigger when the trap is in the set position, as illustrated. The abutment 38 engages the bight of the trigger at a location substantially in a plane perpendicular to the top surface of the base 10 and including the axis of the pivotal connection between the jaws and the base to provide a trigger mechanism of extremely light action and the engagement of shoulder 37 with the inner end of notch 42 of the bight precludes lifting the trigger while the trap is set. The trigger further includes a circular treadle portion 43 connected to the U-shaped portion 40 by a downwardly-inclined stem 44 and provided with a substantially central aperture 45. The treadle portion 43 of the trigger is of substantially the same size and shape as the bait-receiving recess 30 in the base, and overlies the bait-receiving recess closely adjacent to the upper surface of the base to restrict the efforts of a rodent to gain access to bait in recess 30 to the aperture 45 in the treadle portion of the trigger. This aperture is of insufficient size to permit the withdrawal of the bait therethrough and pressure on the treadle portion incident to attempts to reach the bait through this aperture will trip the trap.

Both jaws 11 and 12 may be set simultaneously, as illustrated in Figure 1, or either one of the jaws may be set independently as may be desired. The device may thus be used as a rat trap or a mouse trap or may be set to catch either in case it is not known which type of rodent is present.

It is extremely sensitive in operation and retains the bait in a manner such that, while the scent of the bait is fully effective, the bait cannot be removed without tripping the trap.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A rodent trap comprising a flat, rectangular base, a large jaw comprising a piece of wire formed to rectangular shape, means pivotally connecting one side of said large jaw to said base so that said one side extends transversely of the base substantially at the mid-length location of the latter, a pair of spaced apart torsion springs surrounding said one side and respectively connected to the sides of said large jaw perpendicular to said one side and bearing on said base, a small jaw comprising a piece of wire formed to a U-shape and having at its open side a pair of spaced apart eyes surrounding said one side of said large jaw between said springs, a trigger pivotally connected to said one side of the large jaw substantially mid-way between the eyes of said small jaw, a pair of springs respectively surrounding said one side of the large jaw between the eyes of said small jaw and said trigger and respectively connected to the legs of said small jaw and bearing on said base, and a jaw restraining bar pivotally connected at one end to said base near one end of the latter and engageable at its opposite end by said trigger to releasably hold either one or both of said jaws in set position relative to said base.

HEINRICH A. W. PETERSEN.

REFERENCES CITED

The following references are of record in the file of this patent:

UNITED STATES PATENTS

| Number | Name | Date |
| --- | --- | --- |
| 674,669 | Botsford | May 21, 1901 |
| 818,239 | Firnhaber | Apr. 17, 1906 |
| 1,665,951 | Ebel | Apr. 10, 1928 |
| 1,675,532 | Cessna | July 3, 1928 |
| 1,861,479 | Kleffman | June 7, 1932 |
| 2,193,358 | Guarino | Mar. 12, 1940 |